Aug. 18, 1931.     F. D. GOODLAKE     1,819,891
TIRE
Filed Jan. 21, 1929
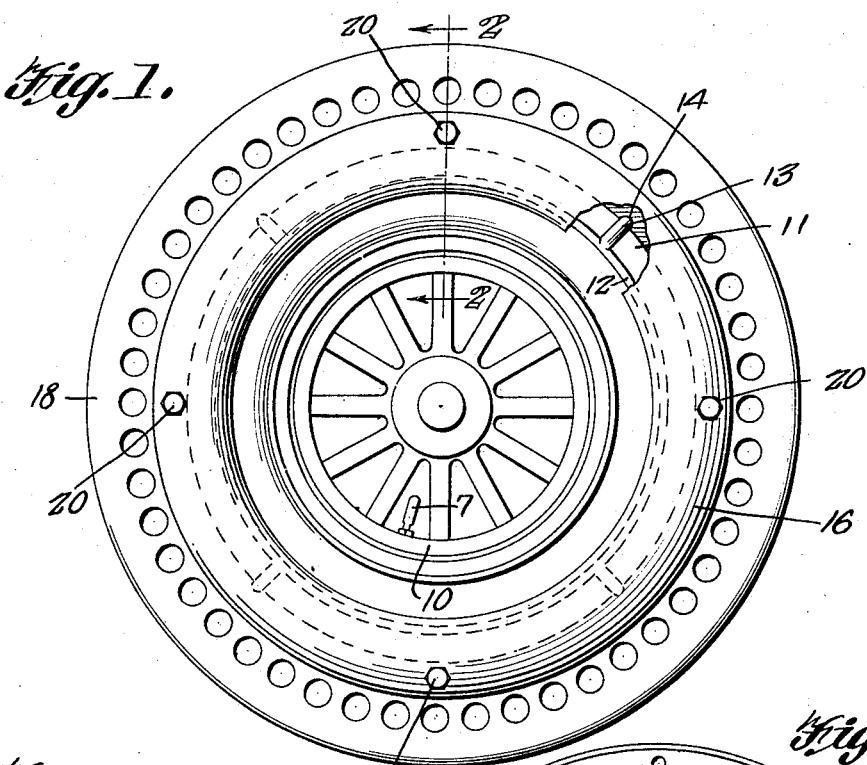
Fig. 1.
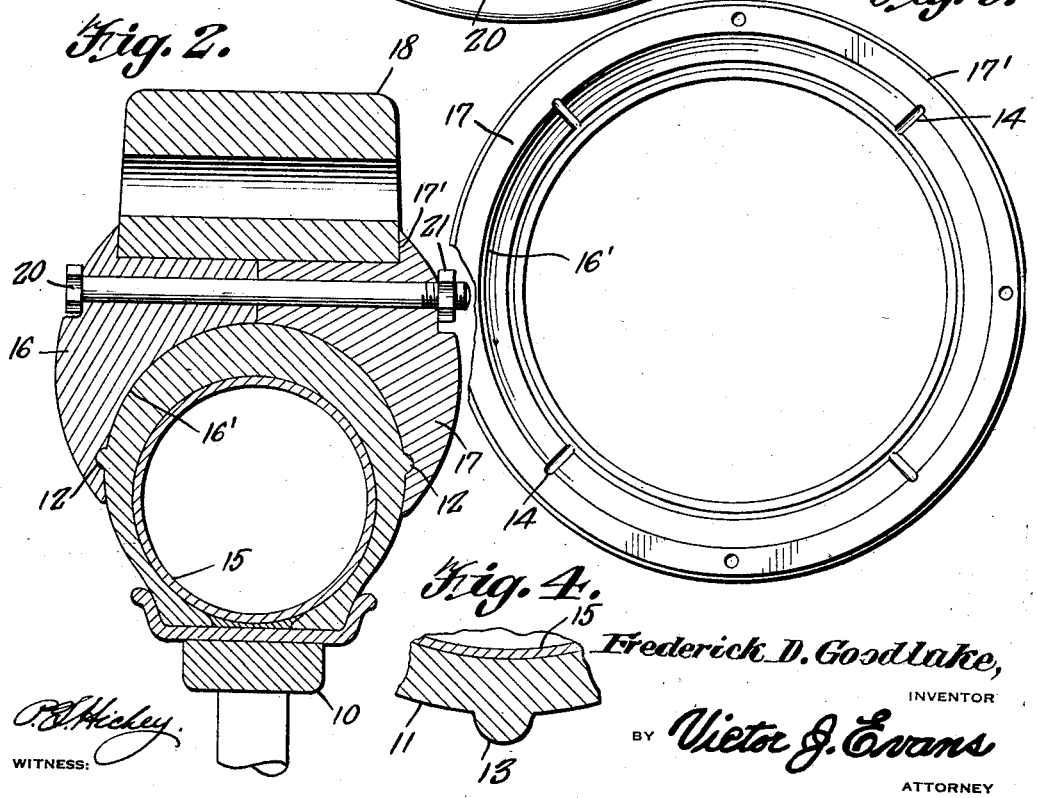
Fig. 2.
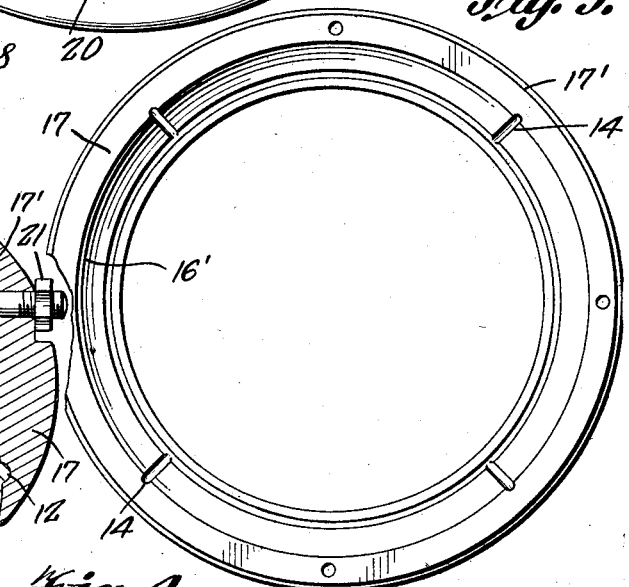
Fig. 3.
Fig. 4.
Frederick D. Goodlake,
INVENTOR
BY Victor J. Evans
ATTORNEY
WITNESS: P. B. Hickey Patented Aug. 18, 1931

1,819,891

UNITED STATES PATENT OFFICE

FREDERICK DEAN GOODLAKE, OF MEMPHIS, TENNESSEE

TIRE

Application filed January 21, 1929. Serial No. 334,007.

The object of this invention is to provide for the use of a balloon tire in such manner and under such conditions that its life will be greatly increased, and a greater degree of efficiency will be realized during the entire time in which the tire is in use, or during the life of the car to which the tires are applied.

A further object is to effect this result by the use of additional elements which will render unnecessary the employment of an inner tube, and which will prevent damage by puncture, rim cuts or blow-outs.

A further object is to employ structure which may include a plurality of annular elements adapted to fit the tread portion of the balloon tire, and extend over a portion of the sides, these elements being channel shaped on the sides adjacent to the tread and said elements having outer channels forming together a circumferential groove receiving a tread member to be retained between the edges of the outer channels—the annular elements to be clamped and to be retained against creeping action by the means disclosed below.

A further object is to protect the balloon tire and the entire structure from damage by water which might otherwise enter, between any of the elements.

In the drawings forming part of this application:

Figure 1 shows the tire structure in side elevation, as applied to a wheel.

Figure 2 is a section on line 2—2 of Figure 1.

Figure 3 shows one of the annular metallic elements in elevation, from the inner side thereof.

Figure 4 is a detail view showing an outer bead or rib intended especially to prevent creeping action.

A wheel is shown conventionally at 10 and carried thereby is a balloon tire 11, the main portion of which conforms to standard of usual construction, with the addition however of a circumferential bead 12, one of these beads being provided on each side, and an outer transversely extending bead being provided at intervals as illustrated in Figures 1 and 4, for the purpose of preventing creeping action, and for the purpose of providing a secure connection between the balloon tire and the annular elements to be referred to, which elements are formed with grooves or channels on the inner sides, cooperating with all of the beads, and when the parts are cemented together no independent movement producing friction will be possible. The transverse beads 13 engage recesses 14 for this purpose.

An inner tube is shown at 15, but this is only for the purpose of indicating its position if used, it being understood that no inner tube is essential to the complete and proper functioning of the tire being disclosed. Under the conditions last named, with no inner tube, I avoid all friction and heat resulting therefrom which under usual conditions has a very important bearing on the limitation of the life of the tire.

The annular elements 16 and 17 are preferably of aluminum, no limitation in this respect being intended or implied. The inner sides are provided with channels 16' conforming to the curvature of the tire, and the outer portions of the annular elements are provided with grooves as indicated at 17', for the reception of tread 18 which is to be molded into position after the elements already disclosed have been assembled. The tread may be provided with transverse openings, bores, or apertures, for the purpose of increasing resiliency, and the annular elements are of such cross section that the sides of the balloon tire are fully protected from damage such as that usually arising from abrasive action, rim cuts and the like.

Bolts or other securing devices 20 retain the annular elements 16 and 17 if formed separately as illustrated and the bolts are retained by nuts 21.

It will be observed that in the use of the tire thus constructed provision has been made whereby all usual or unusual difficulties caused during proper or severe use of the car are avoided, and much is saved in cost, the quantity of rubber required for tires during the life of any one car being reduced to an important extent.

What I claim is:

In a device of the class described, a tubular member of balloon tire construction, annular protecting elements surrounding the balloon tire and extending along the sides thereof, clamping means for the annular elements, a tread mounted on the annular elements, and means including interengaging devices extending annularly and transversely of the tire and the annular elements, for preventing creeping action, said clamping means producing pressure, through the protecting elements, on the sides of the tread, and producing pressure on the tire at points between the interengaging devices having an annular direction and that diameter of the tire having a direction parallel with the axis of rotation of a wheel mounting the tire, the annular interengaging devices excluding moisture intermediate of the pressure zones specified, and being positioned near the edges of the protecting elements.

In testimony whereof I affix my signature.

FREDERICK DEAN GOODLAKE.